United States Patent
Yong et al.

(10) Patent No.: US 7,756,977 B2
(45) Date of Patent: Jul. 13, 2010

(54) RANDOM EARLY DETECT AND DIFFERENTIAL PACKET AGING FLOW CONTROL IN SWITCH QUEUES

(75) Inventors: Yean Kee Yong, Singapore (SG); Hong Lee Koo, Singapore (SG)

(73) Assignee: Infineon Technologies AG, Munich (DE)

( * ) Notice: Subject to any disclaimer, the term of this patent is extended or adjusted under 35 U.S.C. 154(b) by 251 days.

(21) Appl. No.: 11/495,651

(22) Filed: Jul. 28, 2006

(65) Prior Publication Data

US 2006/0265424 A1 Nov. 23, 2006

Related U.S. Application Data

(62) Division of application No. 10/752,622, filed on Jan. 6, 2004, now abandoned.

(51) Int. Cl.
*G06F 15/173* (2006.01)
(52) U.S. Cl. .................................................... 709/225
(58) Field of Classification Search ................... None
See application file for complete search history.

(56) References Cited

U.S. PATENT DOCUMENTS

| | | | | |
|---|---|---|---|---|
| 4,642,758 | A | 2/1987 | Teng | |
| 6,081,507 | A * | 6/2000 | Chao et al. | 370/235 |
| 6,091,709 | A * | 7/2000 | Harrison et al. | 370/235 |
| 6,407,999 | B1 * | 6/2002 | Olkkonen et al. | 370/389 |
| 6,594,268 | B1 * | 7/2003 | Aukia et al. | 370/400 |
| 6,594,270 | B1 * | 7/2003 | Drummond-Murray et al. | 370/412 |
| 6,741,562 | B1 * | 5/2004 | Keirouz et al. | 370/230 |
| 6,791,949 | B1 | 9/2004 | Ryu et al. | |
| 6,856,596 | B2 | 2/2005 | Blumer et al. | |
| 6,882,623 | B1 | 4/2005 | Goren et al. | |
| 6,891,834 | B1 * | 5/2005 | Dally et al. | 370/395.4 |
| 6,920,109 | B2 | 7/2005 | Yazaki et al. | |
| 7,031,341 | B2 | 4/2006 | Yu | |
| 7,058,789 | B2 | 6/2006 | Henderson et al. | |
| 2002/0075805 | A1 * | 6/2002 | Gupta et al. | 370/235 |
| 2005/0021491 | A1 * | 1/2005 | Horgan | 707/1 |

OTHER PUBLICATIONS

Mishra et al. ("A Configurable, QoS-aware Ethernet L2+ Switch Optimized for Access Networks", Nov. 6-8, 2002, Local Computer Networks 2002, Proceedings, LCN 2002, 27th Annual IEEE Conference).*

Mubaraq et al. ("Wire-Speed Traffic Management in Ethernet Switches"; May 25-28, 2003, Circuits and Systems 2003 ISCAS'03, IEEE, pp. II-105 thru II-108).*

* cited by examiner

*Primary Examiner*—Ario Etienne
*Assistant Examiner*—Clayton R Williams
(74) *Attorney, Agent, or Firm*—Slater & Matsil, L.L.P.

(57) ABSTRACT

Flow control is provided for a packet switch. An incoming packet is classified according to its priority based on predefined rules to produce a weight value based on the priority of the packet. A lifetime value associated with the packet is produced based on the weight value and the queue occupancy in a queue to which the packet is assigned. The packet is discarded if its associated lifetime value is less than or equal to a threshold value. Otherwise the packet and associated lifetime value are sent to the queue. The lifetime value is periodically changed and compared to a threshold value. The packet is removed from the queue when its lifetime value reaches the threshold value.

10 Claims, 3 Drawing Sheets

Differential RED scheme for packet aging process

Flow Diagram of packet aging process in the queues

RANDOM EARLY DETECT AND DIFFERENTIAL PACKET AGING FLOW CONTROL IN SWITCH QUEUES

CROSS-REFERENCE TO RELATED APPLICATIONS

This application is a divisional application of and claims priority to U.S. application Ser. No. 10/752,622, filed on Jan. 6, 2004 now abandoned. The disclosure of the prior application is considered part of (and is incorporated by reference in) the disclosure of this application.

FIELD OF THE INVENTION

The present invention relates to flow control in devices utilizing queuing systems for packets.

BACKGROUND OF THE INVENTION

Devices using queuing systems for packets, for example gateways, switches and routers, are often used in networks supporting IP or TCPIP, such as Ethernet. A problem is, however, that packets get stuck in that queues when there is congestion in the network, or when a link is down or not ready. Under this stuck condition two things happen.

(1) Packets are stored in buffers and referenced through link lists. Complex conditions arise when packets are destined for multiple ports, and the packets can exit from some of the ports but not from others. Furthermore, new packets enter from other ports. The result can be that the packets can get stuck in the buffers indefinitely.

(2) Buffer space can be taken up by packets that are of lower priority, and higher priority packets get dropped.

One prior art solution is to wait until the congesting condition in the port is removed, and then the packets can exit from the port. The disadvantage of this solution is that during the time when the packets are locked in the switching device, they take up valuable space resources. As such, a condition may arise that low priority packets remain locked in the device while high priority packets are dropped when they enter the switching device from other ports.

Another solution is to remove all the packets when they have exceeded a time limit in the switching device. This is done indiscriminately for all packets regardless of priority. The disadvantage of this solution is that it does not differentiate between low and high priority packets. It also does not differentiate between time critical packets (e.g. for real time applications such as voice-over-IP, video-over-IP or other types of time critical packets).

It would be desirable to prevent packets from becoming stagnant within queues. It would also be desirable to prevent high-priority packets from being dropped by buffers already filled with low priority packets. Finally, it would be desirable to control the congestion in the network that causes these other problems.

SUMMARY OF THE INVENTION

The present invention helps solve the problems of stagnant packets within queues, dropped high-priority packets and network congestion, using a random early detect and differential packet aging flow control method. A differential random early detect mechanism is used to prevent congestion in the Internet traffic. An aging mechanism solves the problem of packets being locked in the queue of a switching device for a certain time because it cannot exit the queue.

In more general terms, flow control is provided for a packet switch. An incoming packet is classified according to its priority based on predefined rules to produce a weight value based on the priority of the packet. A lifetime value associated with the packet is produced based on the weight value and the queue occupancy in a queue to which the packet is assigned. The packet is discarded if its associated lifetime value is less than or equal to a threshold value. Otherwise the packet and associated lifetime value are sent to the queue. The lifetime value is periodically changed and compared to a threshold value. The packet is removed from the queue when its lifetime value reaches the threshold value.

BRIEF DESCRIPTION OF THE FIGURES

Further preferred features of the invention will now be described for the sake of example only with reference to the following figures, in which.

DETAILED DESCRIPTION OF THE EMBODIMENTS

Figure 1:
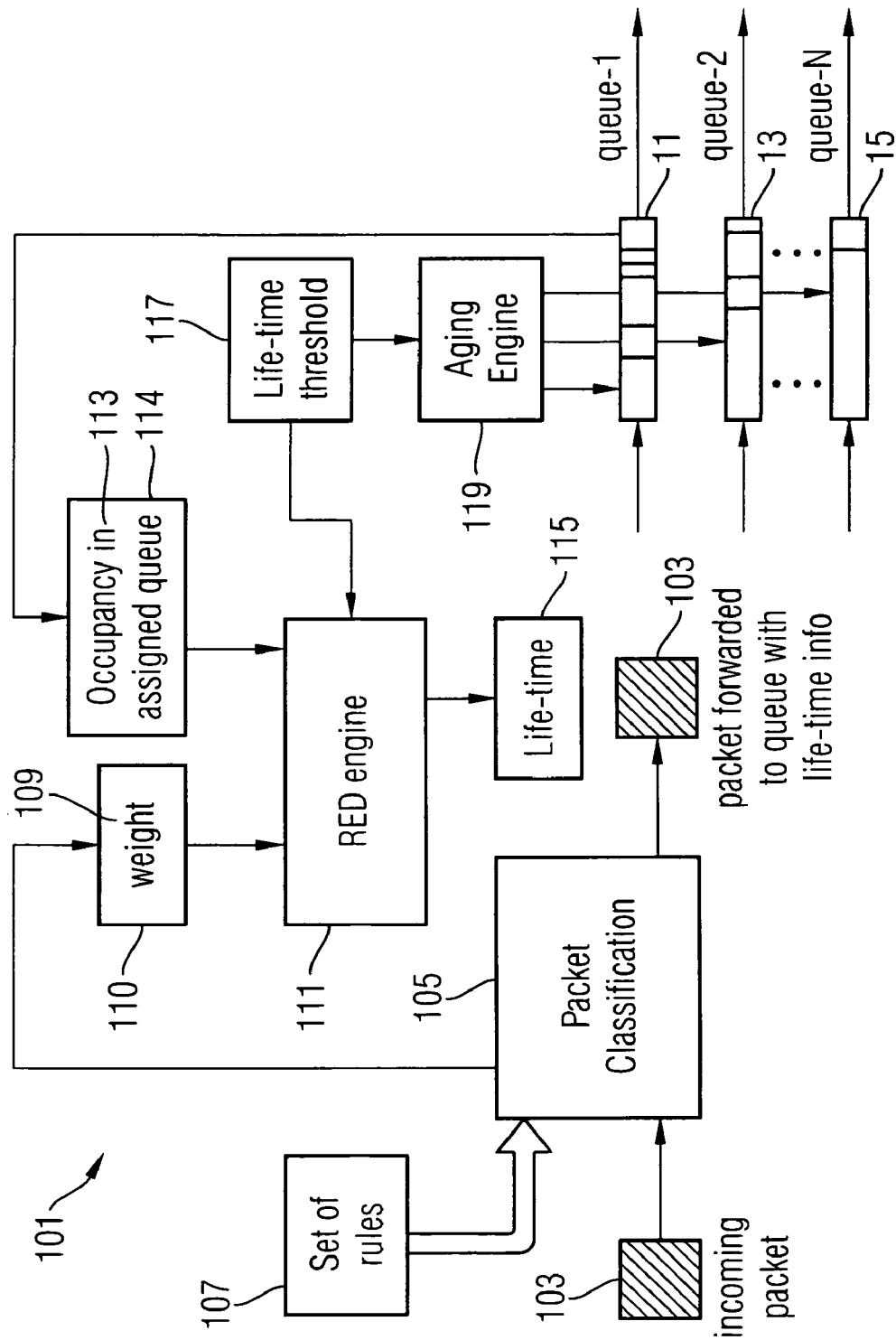
FIG. 1 is a schematic diagram illustrating a switching device implementing the differential packet aging and random early detect method of the present invention.

FIG. 1 is a schematic diagram illustrating a switching device 101 implementing the differential packet aging and random early detect method of the present invention to control one or more queues 11, 13, 15. A packet 103 enters a packet classification engine 105 of the switching device 101. The classification engine 105 checks the priority of the packet based on a set of rules 107 that can be programmed by a user or which can be hard-coded.

Based on the priority determined by the classification engine 105, a "weight" value 109 is determined by a weight value determination section 110 and is assigned to the packet 103. Packets that should be aged out faster from the queue will have a smaller weight, and thus have a higher probability for a shorter lifetime.

The weight value is then fed into a "random early detect" (RED) engine 111. Also, the queue occupancy (number of packets) 113 in the queue to which the packet 103 is assigned (in this example the queue 11) is determined by a queue occupancy section 114 and is fed into the RED engine 111. The RED engine 111 uses the weight value 109 and the queue occupancy 113 to determine a lifetime 115 of the packet 103 in the queue 11. The lifetime 115 is a random aging time based on the random early detect scheme.

Figure 2:
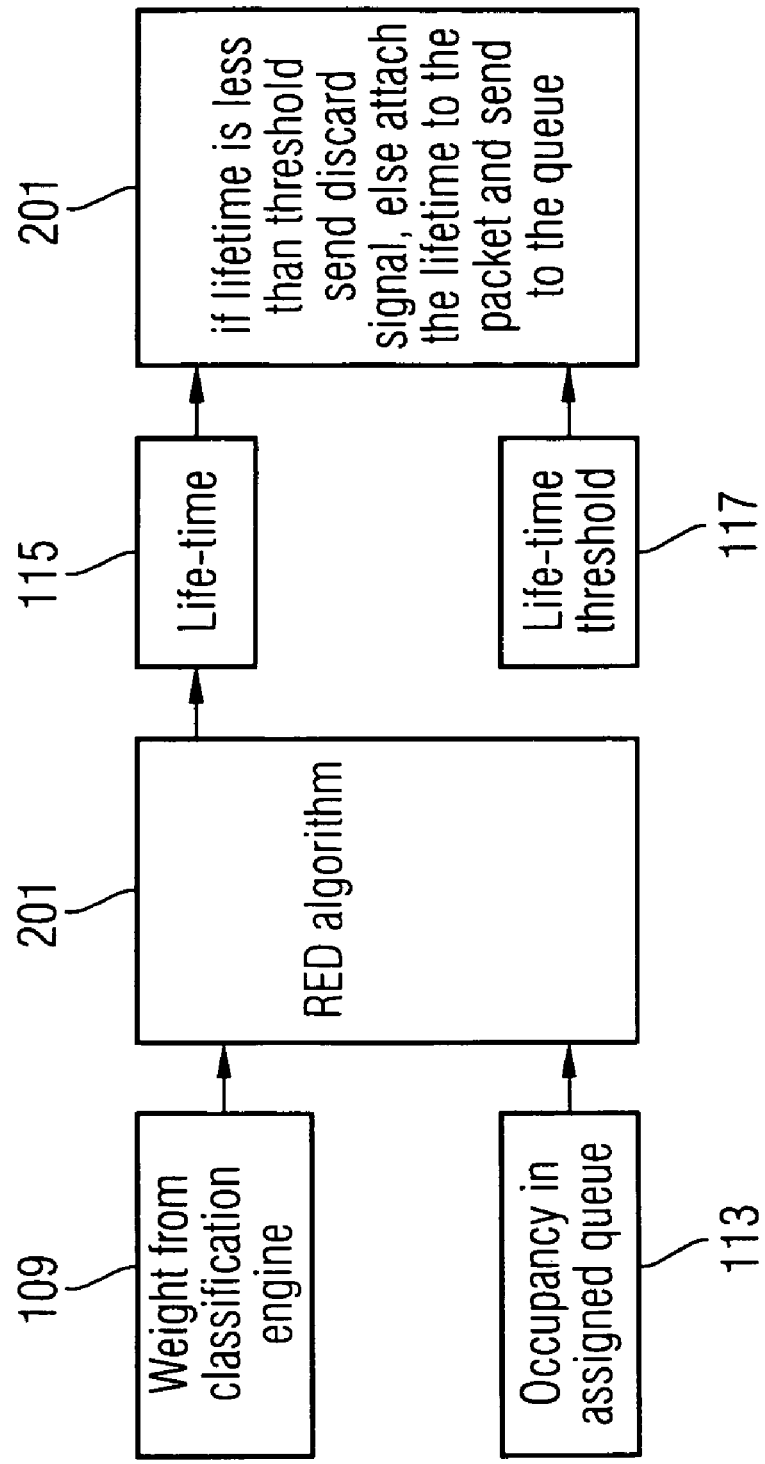
FIG. 2 diagrammatically illustrates the method performed by the RED engine of FIG. 1.

Once the lifetime 115 is assigned to the packet 103, the RED engine 111 checks the lifetime 115 against a lifetime threshold 117. FIG. 2 shows the method performed by the RED engine 111 in more detail. The weight value 109 and the queue occupancy 113 are processed using an RED algorithm 201 of the RED engine 111. The RED algorithm 201 calculates a lifetime 115. The RED engine 111 then compares the lifetime 115 to the lifetime threshold 117. If the lifetime 115 is below the threshold 117, the packet is discarded. This helps control congestion in the network. Otherwise the lifetime 115 is attached to the packet 103 and sent to the queue 11 as shown in FIG. 1.

When the packet 103 reaches the queue 11, its life-time is decremented periodically by an aging engine 119. A tick is generated periodically, and the aging engine 119 acts upon this tick. The aging engine 119 looks through all the packets in the queues and decrements their lifetimes by the same amount. When the life time 115 of the packet 103 in the queue 11 reaches the threshold 117, the packet 103 is removed from the queue 11. The resource occupied can then be used by another packet.

Figure 3:
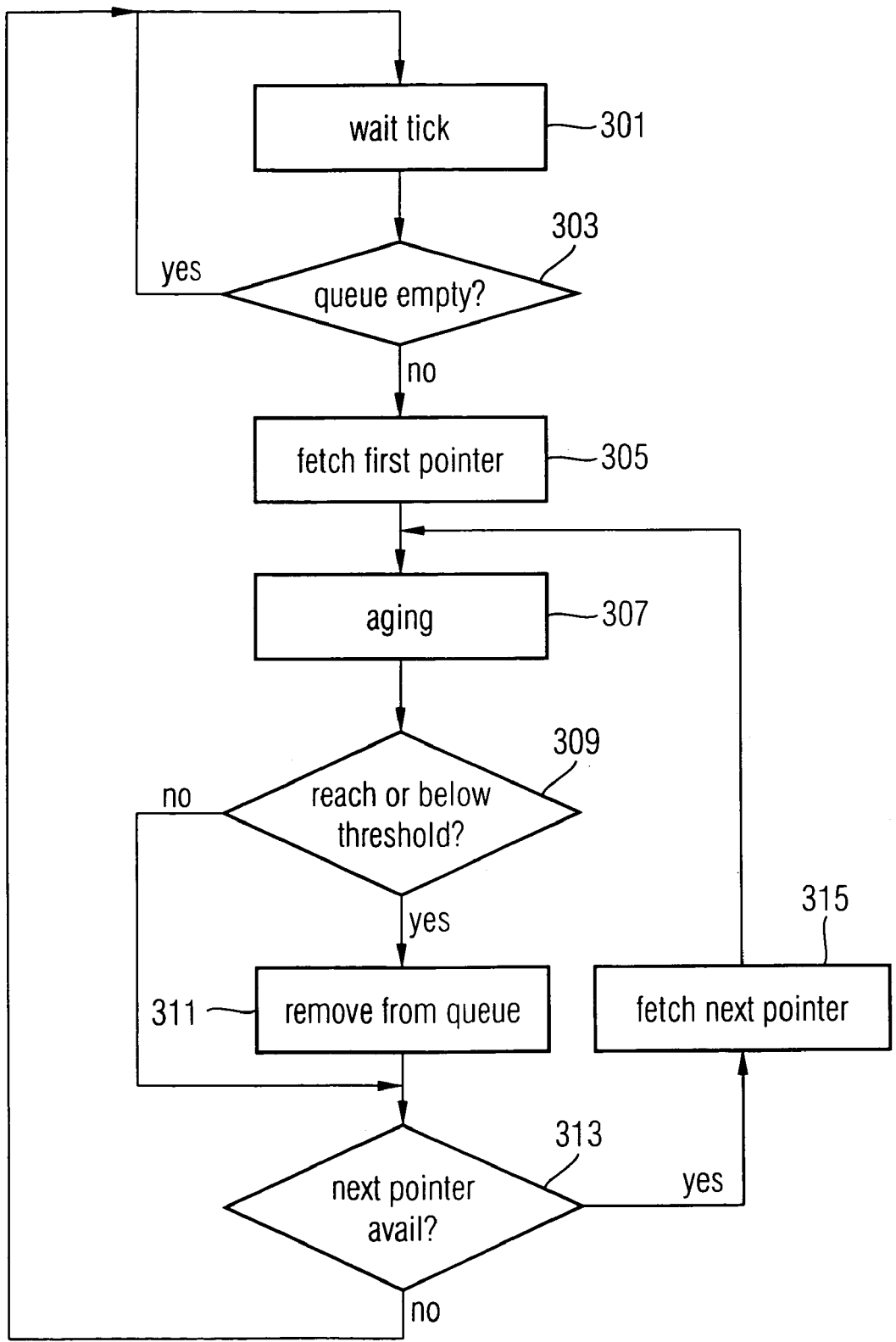
FIG. 3 is a flowchart illustrating the method used by the aging engine of FIG. 1.

FIG. 3 is a flowchart illustrating the method used by the aging engine 119 in greater detail. Wait ticks are periodically generated at step 301 causing step 303 to determine whether or not the queue is empty. The subsequent steps are not performed until a determination is made that the queue has packets in it. If the queue has packets in it then a first packet pointer pointing to a first packet is fetched at step 305. An aging step 307 is performed on the packets in the queue. At step 309 it is determined whether the packet has reached or is below the lifetime threshold 117, and if it has then the packet is removed from the queue at step 311. It then checks for the next available packet at step 313. If the next packet is not available then the method goes back to periodically generating wait ticks at step 301. If the next packet is found at step 313, then the next packet pointer is fetched at step 315 (the pointer points to the packet next to the packet that was previously pointed to) and the method returns to the step 307.

Thus the present invention solves the problems of the prior art:

a) The problem of packets locked within a port indefinitely is solved. A packet is aged out if they exceed the time limit assigned to it.

b) The problem of packets being aged out indiscriminately is solved. Packets are aged out based on the differential random early detection scheme.

c) Network Congestion is reduced using the random early detection scheme.

The described invention is appropriate for complex gateways, switches and routers, where the extra gate-count introduced is not much compared to the overall count in the chip. However, in a simpler embodiment, more appropriate for implementation in simple switches, routers, etc., where gate-count is an issue, the differential packet aging is performed without performing RED. The lifetime 115 is assigned directly to the packet based on the set of rules 107 without first determining the weight 109 or determining the queue occupancy 113 as in FIG. 1. Packets that should be aged out faster are assigned a lower lifetime. All the packets in the queue are decremented at the same frequency. When the lifetime of the packet in the queue reaches a threshold, the packet is removed from the queue. Thus, in this embodiment, packets are aged out if they exceed the time limits assigned to them or based on the priority assigned to them.

Thus, although the invention has been described above using particular embodiments, many variations are possible within the scope of the claims, as will be clear to a skilled reader.

What is claimed is:

1. A packet switch comprising:

a plurality of ports, wherein at least one of the plurality of ports is configured to accept an incoming packet;

a packet classification engine configured to classify the incoming packet according to its priority based on Quality of Service wherein the classification is used by a first engine to produce a lifetime value, the lifetime value relating to an aging time, and wherein the packet classification engine determines a weight value based on the priority of the incoming packet;

an output queue configured to receive the incoming packet and the associated lifetime value, wherein the output queue comprises a buffer to store the incoming packet;

an aging engine configured to periodically change the lifetime value of the incoming packet in the output queue;

the first engine configured to produce the lifetime value based on the weight value and a queue occupancy in the output queue to which the incoming packet is assigned; and a comparator configured to remove the incoming packet from the output queue when the changed lifetime value reaches a predetermined threshold value.

2. The packet switch of claim 1, wherein the first engine is further configured
to discard the incoming packet if its associated lifetime value is below the predetermined threshold value.

3. The packet switch of claim 1 wherein the first engine is further configured to discard the incoming packet before sending the incoming packet and its associated lifetime value to the output queue if its associated lifetime value is below the predetermined threshold value.

4. The packet switch of claim 1, wherein the aging engine is further configured to periodically decrement the lifetime value of the incoming packet in the output queue.

5. The packet switch of claim 1, wherein the buffer comprises logic gates.

6. A computer network comprising the packet switch of claim 1.

7. The packet switch of claim 1, wherein the packet classification engine is implemented on a chip.

8. The packet switch of claim 1, wherein the first engine comprises a random early detect engine.

9. The packet switch of claim 8, wherein the random early detect engine is further configured to produce the lifetime value based on a random aging time.

10. The packet switch of claim 1, wherein a packet with a lower weight value is aged out faster than a packet with a higher weight value.

* * * * *